(12) United States Patent
Horiguchi (10) Patent No.: US 8,098,357 B2
(45) Date of Patent: Jan. 17, 2012

(54) LIQUID CRYSTAL DISPLAY PANEL

(75) Inventor: Masahiro Horiguchi, Shiojiri (JP)

(73) Assignee: Sony Corporation, Tokyo (JP)

( * ) Notice: Subject to any disclaimer, the term of this patent is extended or adjusted under 35 U.S.C. 154(b) by 339 days.

(21) Appl. No.: 12/468,515

(22) Filed: May 19, 2009

(65) Prior Publication Data

US 2010/0002179 A1    Jan. 7, 2010

(30) Foreign Application Priority Data

Jul. 2, 2008  (JP) .................................. 2008-173104

(51) Int. Cl.
*G02F 1/1343* (2006.01)

(52) U.S. Cl. ........................................ 349/141; 349/143

(58) Field of Classification Search ........................ None
See application file for complete search history.

(56) References Cited

U.S. PATENT DOCUMENTS

| | | | |
|---|---|---|---|
| 6,580,487 B1* | 6/2003 | Kim et al. ..................... | 349/141 |
| 7,826,022 B2* | 11/2010 | Iwakabe et al. ............... | 349/141 |
| 2005/0078262 A1* | 4/2005 | Ono et al. ..................... | 349/141 |
| 2006/0238687 A1* | 10/2006 | Su ................................ | 349/129 |
| 2009/0009671 A1* | 1/2009 | Wakabayashi ................ | 349/33 |
| 2009/0185125 A1* | 7/2009 | Hida et al. .................... | 349/141 |

FOREIGN PATENT DOCUMENTS

JP    A-2002-90781    3/2002

* cited by examiner

*Primary Examiner* — Hemang Sanghavi
(74) *Attorney, Agent, or Firm* — K&L Gates LLP (57) ABSTRACT

A liquid crystal display includes: a pair of substrates which are disposed so as to be opposite each other and have a liquid crystal layer interposed therebetween; an upper electrode configured to be included in one substrate of the pair of substrates, and be formed so as to have a plurality of slits therein; and a lower electrode configured to be included in the one substrate of the pair of substrates, and be formed on an insulating film covering the upper electrode so as to be partially overlapped with the upper electrode in plan view; wherein the lower electrode has at least one slit which is formed so as to be parallel with the plurality of slits formed in the upper electrode; and wherein the at least one slit formed in the lower electrode is formed so as to be overlapped with the upper electrode in plan view.

6 Claims, 8 Drawing Sheets

LIQUID CRYSTAL DISPLAY PANEL

BACKGROUND

1. Technical Field

The present invention relates to liquid crystal display panels adopting the horizontal electric field mode and, more particularly, to a liquid crystal display panel employing the fringe field switching (which will be hereinafter termed "FFS") mode, for which a high aperture ratio and low power consumption can be achieved by appropriately forming each storage capacitor included therein.

2. Field of Invention

Liquid crystal display panels, which are characterized by lightness in weight, small thickness and low power consumption as compared with cathode-ray tubes (CRTs), have been used for various types of electrical devices as displays incorporated therein. A principle for displaying images employed in such a liquid crystal display panel is such that, an amount of transmitted light or an amount of reflected light varies in accordance with alignment direction changes of individual liquid crystal molecules in proportion to the intensity of an electric field applied to the liquid crystal molecules, each of which is initially aligned in a prescribed direction resulting from a rubbing process performed on alignment films having the liquid crystal molecules interposed therebetween.

There are two modes in methods of applying an electric field to a liquid crystal layer included in a liquid crystal display, one being a vertical electric field mode, the other one being a horizontal electric field mode. In a liquid crystal display panel adopting the vertical electric field mode, an electric field, which is generated by a pair of electrodes having a liquid crystal layer interposed therebetween and extends in a direction substantially vertical relative to the pair of electrodes, is applied to liquid crystal molecules included in the liquid crystal layer. For liquid crystal displays adopting the vertical electric field mode, various modes, such as a twisted nematic (TN) mode, a vertical alignment (VA) mode and a multi-domain vertical alignment (MVA), are well known to those skilled in the art. In a liquid crystal display panel adopting the horizontal electric field mode, an electric field, which is generated by a pair of electrodes being formed in a mutually insulated condition at the inside side of one of the pair of substrates having a liquid crystal layer interposed therebetween and extends in a direction substantially horizontal relative to the pair of electrodes, is applied to liquid crystal molecules included in the liquid crystal layer. For the liquid crystal display panels adopting the horizontal electric field mode, an in-plane switching (IPS) mode, in which the pair of electrodes are formed so as not to be overlapped in plan view, and a fringe field switching (FFS) mode, in which the pair of electrodes are formed so as to be overlapped in plan view, are well known to those skilled in the art.

Among these liquid crystal display panels employing various modes, a liquid crystal display panel employing the FFS mode includes a plurality of pairs of an upper electrode and a lower electrode having an insulating film interposed therebetween, the upper electrode and the lower electrode being located on different layers, respectively, and further, the upper electrode includes slit-shaped apertures therein, through which an electric field extending in a substantially horizontal direction is applied to the liquid crystal layer. Such liquid crystal display panels employing the FFS mode have advantages of a large viewing angle and improved image contrast, and thus, nowadays, are in widespread use. Hereinafter, a configuration of a liquid crystal display panel employing the FFS mode disclosed in JP-A-2002-90781 will be described with reference to FIGS. 7 and 8.

Figure 7:
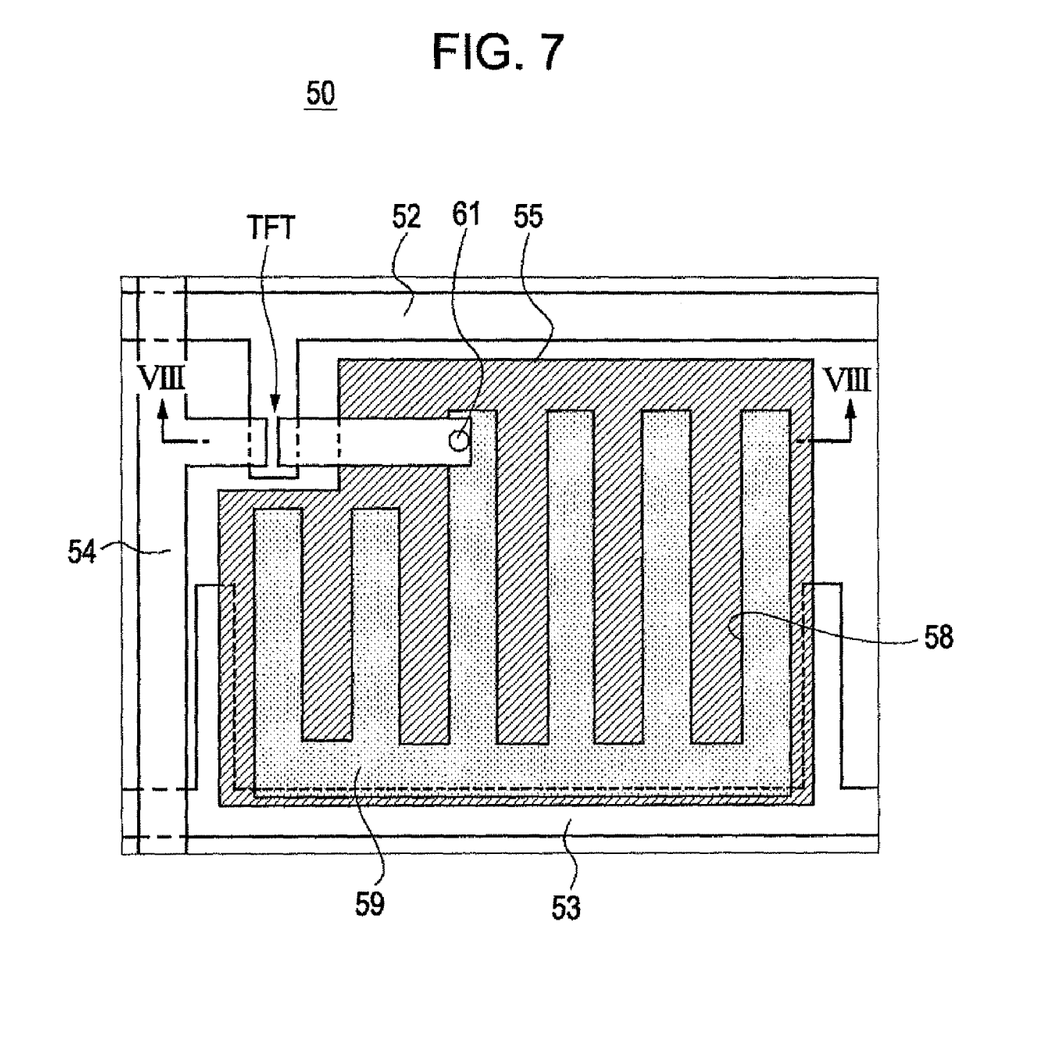
FIG. 7 is a schematic plan view illustrating a one-pixel area of an array substrate of an existing liquid crystal display panel employing the FFS mode.
Figure 8:
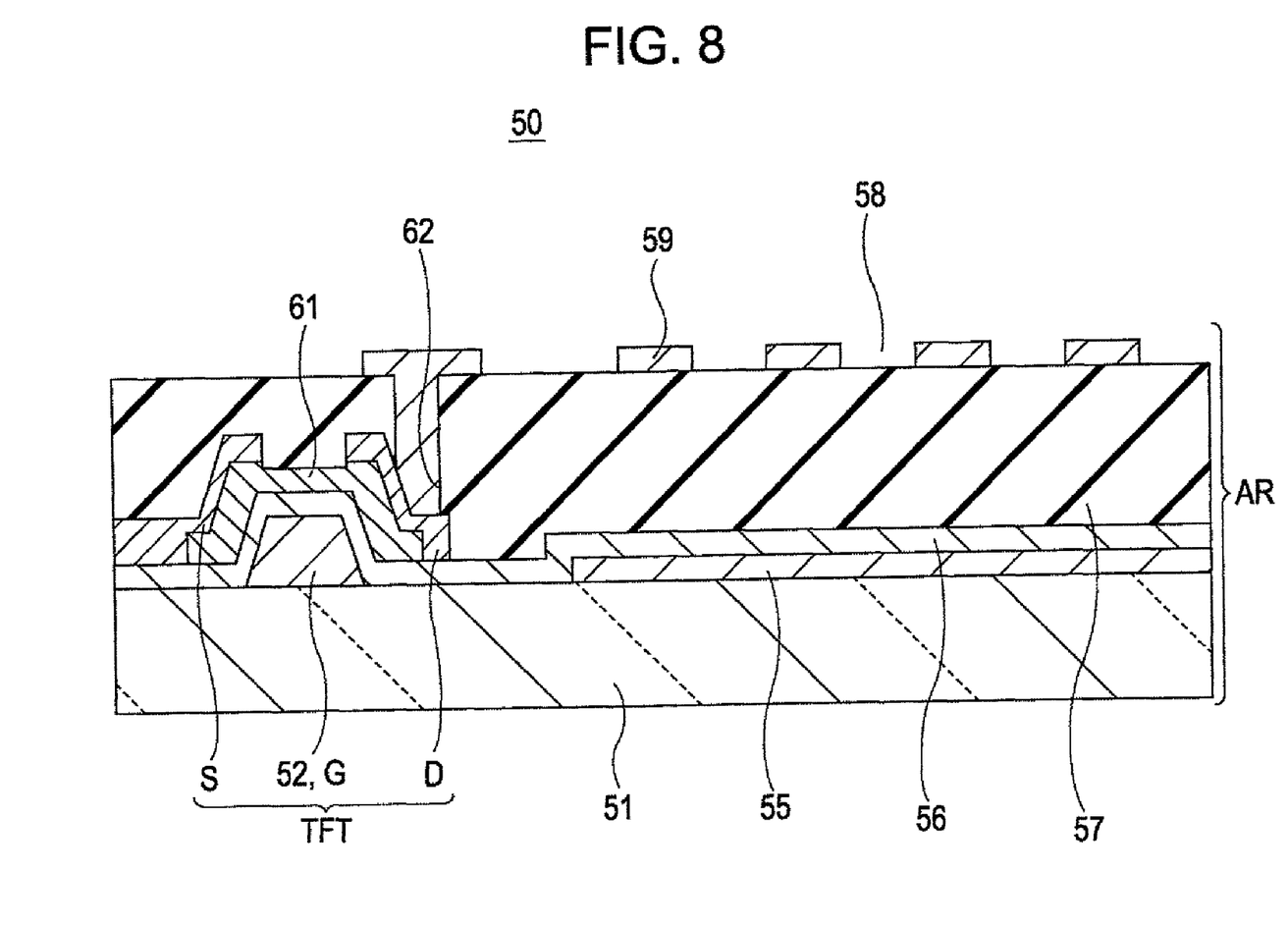
FIG. 8 is a schematic sectional view taken along the line VIII-VIII of FIG. 7.

FIG. 7 is a schematic plan view illustrating a one-pixel area of an array substrate included in a liquid crystal display panel employing the FFS mode, which is disclosed in JP-A-2002-90781. FIG. 8 is a schematic sectional view taken along the line VIII-VIII of FIG. 7.

A liquid crystal display panel 50 shown in FIGS. 7 and 8 includes an array substrate AR and a color filtering substrate (not shown in figures). In the array substrate AR, a plurality of scanning lines 52 and common wiring 53 are formed on the surface of a transparent substrate 51 so as to be parallel with each other, and further, in a direction orthogonal to the extension directions of the scanning lines 52 and the common wiring 53, a plurality of signal lines 54 are formed. Moreover, each lower electrode 55, which is composed of a transparent conductive material, such as indium tin oxide (ITO), and is connected to the common wiring 53, is formed so as to cover one of areas partitioned by the scanning lines 52 and the signal lines 54, and further, on a gate insulating film 56 and a passivation film 57 covering the surface of the lower electrode 55, upper electrodes 59 each being composed of a transparent material, such as an ITO, and having a plurality of stripe-shaped slits 58 are formed. Further, surfaces of the upper electrodes 59 and the plurality of slits 58 are coated by an alignment film (not shown in figures).

Moreover, a thin film transistor (TFT) operating as a switching element is formed adjacent to a position at which one of the scanning lines 52 and one of the signal lines 54 intersect each other. With respect to the TFT, a semiconductor layer 61 is formed on the gate insulating film 56 covering the surface of the scanning lines 52, and a portion of the signal lines 54, extending so as to partially cover the surface of the semiconductor layer 61, constitutes a source electrode S of the TFT, and a portion of the scanning lines 52, being located below the semiconductor layer 61, constitutes a gate electrode G of the TFT, and further, a portion of the upper electrode 59, overlapping a part of the semiconductor layer 61, constitutes a drain electrode D of the TFT. Further, the upper electrode 59 is electrically connected to the drain electrode D through a contact hole 62, which is formed in the passivation film 57.

Further, the color filtering substrate, which is omitted from being illustrated, includes a color filter layer, an overcoat layer and an alignment film on a transparent substrate included therein. Moreover, further configurations, which allow, firstly, the array substrate AR and the color filtering substrate to be located so as to be opposite each other so that each pair of an upper electrode and the corresponding lower electrode included in the array substrate AR is opposite to a specific portion of the color filter layer included in the color filtering substrate, secondly, the liquid crystal layer to be shielded between the array substrate and the color filtering substrate, and thirdly, two polarization plates to be located outside the array substrate and the color filtering substrate, respectively, so that polarization directions thereof are orthogonal to each other, enables realization of the liquid crystal display panel 50 employing the FFS mode. In this liquid crystal display panel 50 employing the FFS mode, each upper electrode 59 and the corresponding lower electrode 55 are configured to be located so as to be opposite each other and have the gate insulating film 56 and the passivation film 57 interposed therebetween, and as a result, a capacitance is generated between each upper electrode 59 and the corresponding lower electrode 55. Accordingly, the liquid crystal display panel 50 employing the FFS mode, in which the whole of each pixel area is allowed to operate as a storage capacitor, does not particularly require formation of a storage capacitance in the pixel area, and as a result, has an advantage in that an aperture ratio is increased to a greater degree than in the case of existing liquid crystal panels adopting the vertical electric field mode for which formation of each storage capacitance is particularly required.

However, in a liquid crystal display panel employing the FFS mode, in the case where each storage capacitance is formed by an upper electrode, a lower electrode and an insulating film interposed therebetween, the storage capacitance formed in a pixel area increases in proportion to the dimensions of the pixel area. In liquid crystal display panels having a low degree of fineness which is, for example, approximately 100 pixel per inch (ppi), the dimensions of the pixel area become large, and thus, the storage capacitance becomes large in proportion thereto, and further, so as to supply each pixel with sufficient charge, the size of each TFT is required to be large, and this TFT of large size adversely results in reducing of an aperture ratio. Furthermore, in proportion to increasing the amount of charge stored in each pixel, an amount of power consumed in the liquid crystal display panel is likely to increase.

SUMMARY

Accordingly, it is desired to provide a liquid crystal display panel employing the FFS mode of a high aperture ratio and lower power consumption which can be achieved by making the storage capacitance formed in each pixel be of an appropriate size.

A liquid crystal display panel according to an aspect of the invention includes: a pair of substrates which are disposed so as to be opposite each other and have a liquid crystal layer interposed therebetween; an upper electrode configured to be included in one substrate of the pair of substrates, and be formed so as to have a plurality of slits therein; and a lower electrode configured to be included in the substrate of the pair of substrates, and be formed on an insulating film covering the upper electrode so as to be partially overlapped with the upper electrode in plan view; wherein the lower electrode has at least one slit which is formed so as to be parallel with the plurality of slits formed in the upper electrode; and wherein the at least one slit formed in the lower electrode is formed so as to be overlapped with the upper electrode in plan view.

A liquid crystal display panel according to an aspect of the invention includes: a pair of substrates which are disposed so as to be opposite each other and have a liquid crystal layer interposed therebetween; an upper electrode configured to be included in one substrate of the pair of substrates, and be formed so as to have a plurality of slits therein; and a lower electrode configured to be included in the substrate of the pair of substrates, and be formed on an insulating film covering the upper electrode so as to be partially overlapped with the upper electrode in plan view. Such a configuration as described above allows the liquid crystal display panel to operate in the FFS mode. In addition, the insulating film can be composed of an inorganic insulating film, such as a silicon oxide film or a silicon nitride film. Further, the lower electrode and the upper electrode are composed of a transparent conductive material, such as an indium tin oxide (ITO) or an indium zinc oxide (IZO). Furthermore, as a switching element used in a liquid crystal display panel according to the aspect of the invention, a thin film transistor (TFT) composed of a semiconductor material, such as amorphous silicon or polysilicon, a low temperature silicon (LTPS) TFT, a thin film diode (TFD), or the like can be used.

Further, in the liquid crystal display panel according to the aspect of the invention, the lower electrode has at least one slit which is formed so as to be parallel with the plurality of slits formed in the upper electrode, and the at least one slit formed in the lower electrode is formed so as to be overlapped with the upper electrode in plan view. Forming the at least one slit of the lower electrode so as to be parallel with the plurality of slits of the upper electrode causes the direction of electric fields generated between the upper electrode and the lower electrode to orthogonally intersect with extension directions of long-length sides of the plurality of slits formed in the upper electrode, and thus, enables reducing of misalignments of the liquid crystal molecules.

Furthermore, in the case of a liquid crystal display panel of middle or large size, a one-pixel area of large dimensions proportionally makes each storage capacitance formed therein be of a large size, and thus, requires a switching element for driving the storage capacitance, being of a size large enough to supply the pixel with a large amount of electric current. In the liquid crystal display panel according to the aspect of the invention, the lower electrode is formed at a location which is partially overlapped with the upper electrode in plan view, and further, the at least one slit in the lower electrode is formed so as to be overlapped with the upper electrode in plan view, and as a result, areas being partially overlapped with the lower electrode in plan view are generated in the upper electrode. Further, since a capacitance is not generated in areas of the upper electrode, which are overlapped with the at least one slit formed in the lower electrode, in the liquid crystal display panel according to the aspect of the invention, it is possible to reduce the storage capacitance, thus, downsize each switching element for driving the storage capacitance, and as a result, realize displaying of images of high quality and increase the aperture ratio, to a greater degree than in the case of existing liquid crystal display panels employing the FFS mode of substantially the same size as that of the liquid crystal display panel according to the aspect of the invention. Additionally, in the liquid crystal display panel according to the aspect of the invention, the slits formed in the upper electrode and the lower electrode may have two edges, both being closed edges, or one being an open edge and the other one being a closed edge.

Further, in the liquid crystal display panel according to the aspect of the invention, preferably, the at least one slit formed in the lower electrode is formed so as to be of a width smaller than a width of each portion between two successive slits out of the plurality of slits formed in the upper electrode, and be entirely overlapped with the upper electrode in plan view.

Provided that each slit in the lower electrode is formed so as to be of a width smaller than the width of each portion between two successive slits out of the plurality of slits formed in the upper electrode, and further, is formed so as to be located, in plan view, being entirely overlapped with the upper electrode, no part of each slit in the lower electrode is not seen, in plan view, from any slit of the slits of the upper electrode. Therefore, in the liquid crystal display panel according to this preferable aspect of the invention, below each slit of the upper electrode, the lower electrode certainly exists. Therefore, in the liquid crystal display panel according to this preferable aspect of the invention, it is possible to reduce the storage capacitance and increase the aperture ratio to a greater degree than in the case of existing liquid crystal display panels employing the FFS mode, and furthermore, it is possible to achieve displaying of images of a quality at least substantially the same as that of images displayed in existing liquid crystal display panels employing the FFS mode.

Further, in the liquid crystal display panel according to the aspect of the invention, preferably, the number of the at least one slit formed in the lower electrode is less than the number of the plurality of slits formed in the upper electrode.

The size of each storage capacitance is determined in accordance with dimensions of an area in which, in plan view, an upper electrode and the corresponding lower electrode overlap each other. Therefore, making the number of the slits formed in the lower electrode be less than the number of the slits formed in the upper electrode enables efficiently allocating of the slits of the lower electrode at positions which are overlapped with the upper electrode. Therefore, according to this preferable aspect of the invention, it is possible to achieve a liquid crystal display panel employing the FFS mode for which each storage capacitance is reduced and an aperture ratio is increased.

Further, in the liquid crystal display panel according to the aspect of the invention, preferably, each of the at least one slit formed in the lower electrode is formed so as to be of a width larger than a width of each portion between two successive slits out of the plurality of slits formed in the upper electrode.

In this case, since a transparency ratio of a liquid crystal display panel can be increased in proportion to reducing of a forming pith of the slits formed in the upper electrode and in the lower electrode, it is preferable to minimize the forming pitch of the slits formed in the upper electrode to an extent allowable by a maximum resolution at which an exposure device can operate. Further, making the width of each slit formed in the lower electrode be larger than the width of each slit formed in the upper electrode requires no utilization of a high-resolution exposure device in forming the slits of the lower electrode, and further, enables suppressing of lowering of a transparency ratio due to increasing of the dimensions of the lower electrode. Therefore, according to this preferable aspect of the invention, a low-cost exposure device can be utilized during a manufacturing process of the lower electrode, and further, a liquid crystal display panel employing the FFS mode capable of displaying images with further improved brightness can be achieved.

Further, in the liquid crystal display panel according to the aspect of the invention, the at least one slit formed in the lower electrode includes a plurality of slits, and preferably, each of the plurality of slits formed in the lower electrode is disposed below every second portion of the portions located between two successive slits out of the plurality of slits formed in the upper electrode.

Disposing each slit formed in the lower electrode below every second portion of the portions located between two successive slits out of the plurality of slits formed in the upper electrode requires no utilization of a high-resolution exposure device in forming the slits of the lower electrode, and further, enables suppressing of lowering of a transparency ratio due to increasing of the dimensions of the lower electrode. Therefore, according to this preferable aspect of the invention, a low-cost exposure device can be utilized during a manufacturing process of the lower electrode, and further, a liquid crystal display panel employing the FFS mode capable of displaying images with further improved brightness can be achieved.

Further, in the liquid crystal display panel according to the aspect of the invention, preferably, the lower electrode is formed on an inter-layer film which is formed in the substrate of the pair of substrates.

Forming the lower electrode on the surface of the inter-layer film causes all of elements such as a lower electrode, an insulating film and an upper electrode which constitute a liquid crystal display panel employing the FPS mode to be formed on the inter-layer film. Therefore, according to this preferable aspect of the invention, it is possible to form an upper electrode and a lower electrode across a region of large dimensions within each pixel area, and as a result, to achieve a liquid crystal display panel employing the FFS mode having a higher aperture ratio and being capable of displaying images with a higher brightness.

DESCRIPTION OF EXEMPLARY EMBODIMENTS

Exemplary embodiments will be hereinafter described with reference to the accompanying drawings. It is to be noted, however, that the exemplary embodiments described below are mere examples of a liquid crystal display panel employing the FFS mode according to aspects of the invention, which are described in order to embody technical ideas of the invention, and further, the invention is not intended to be limited to the exemplary examples but can be equivalently applied to any other embodiments falling within the scope of appended claims of the invention. In addition, in each drawing used for explanations in this patent specification, so as to allow respective layers and members to have sizes identifiable from the drawings, respective layers and members are illustrated at different scales and are not illustrated in proportion to actual sizes thereof.

Figure 1:
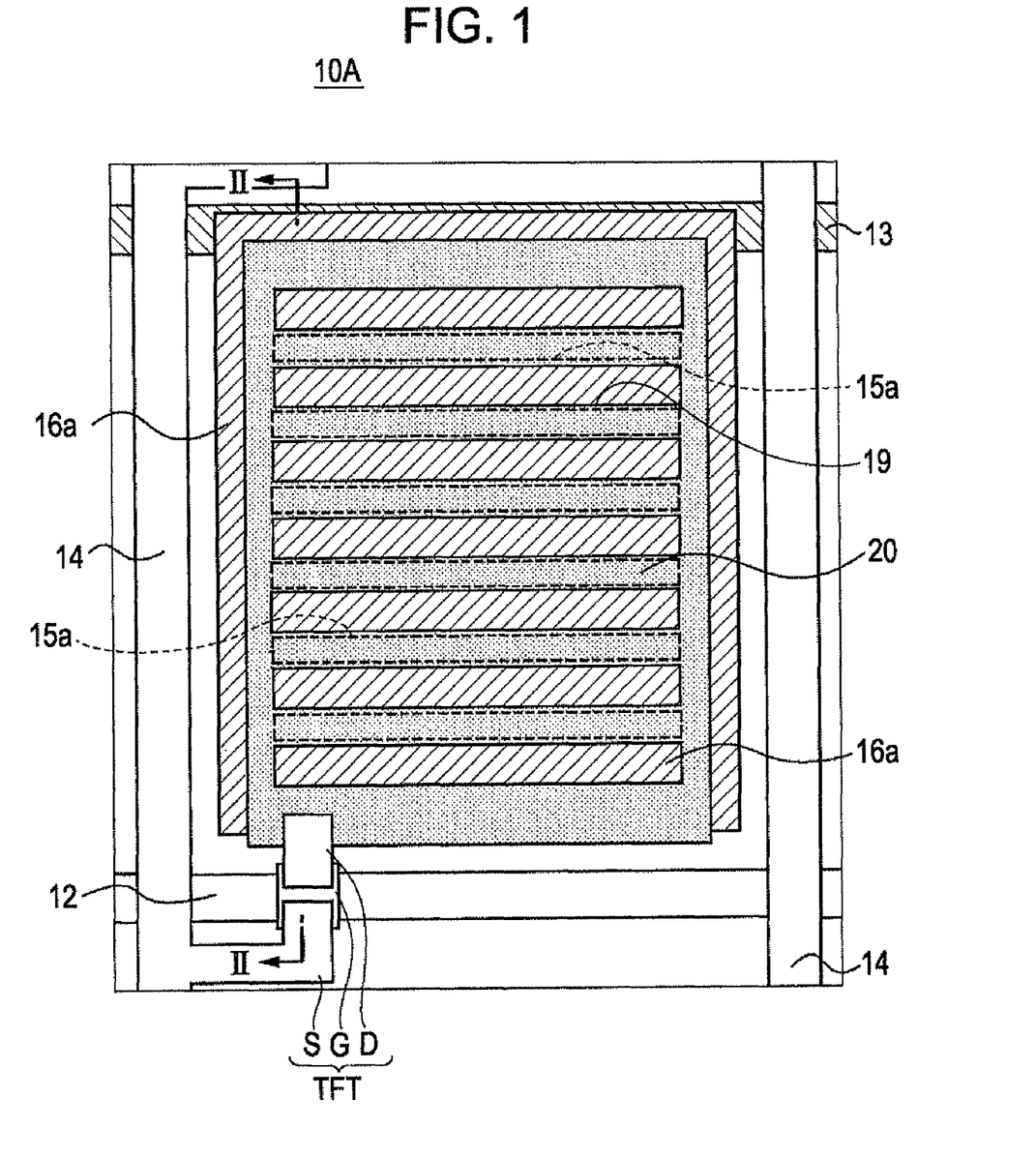
FIG. 1 is a schematic plan view illustrating a one-pixel area on a TFT substrate of a liquid crystal display panel according to a first embodiment of the invention.
Figure 2:
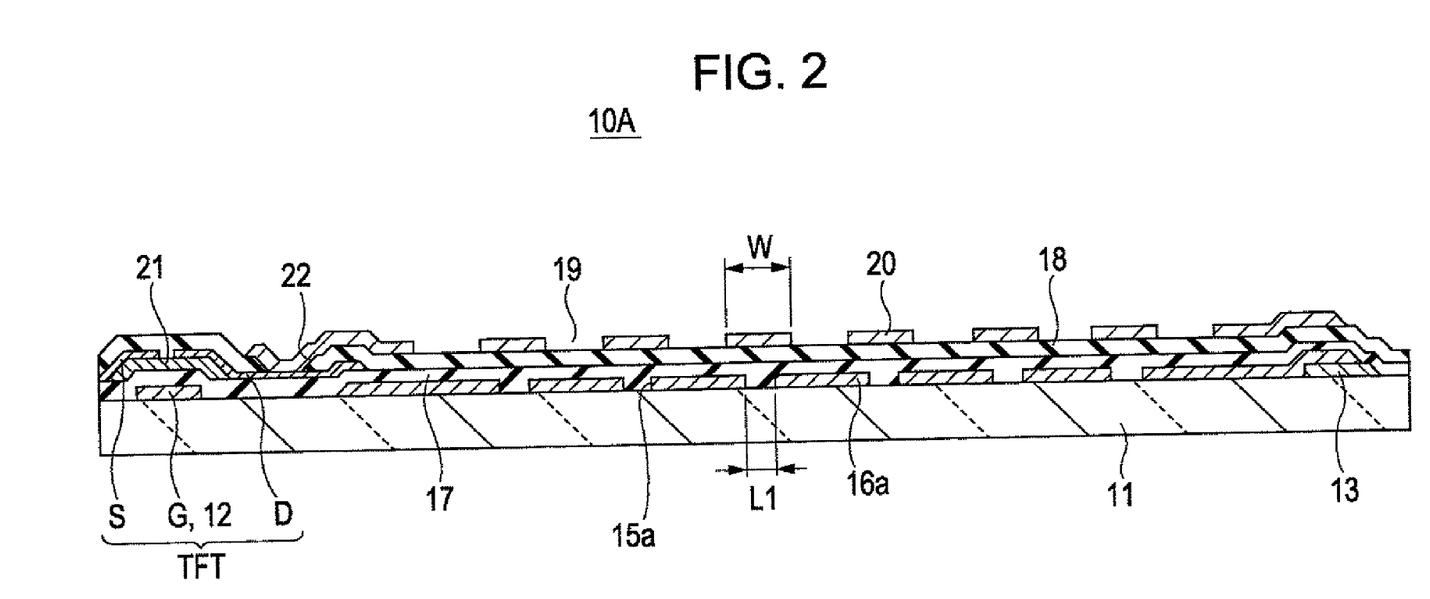
FIG. 2 is a sectional view taken along the II-II line of FIG. 2.
Figure 3:
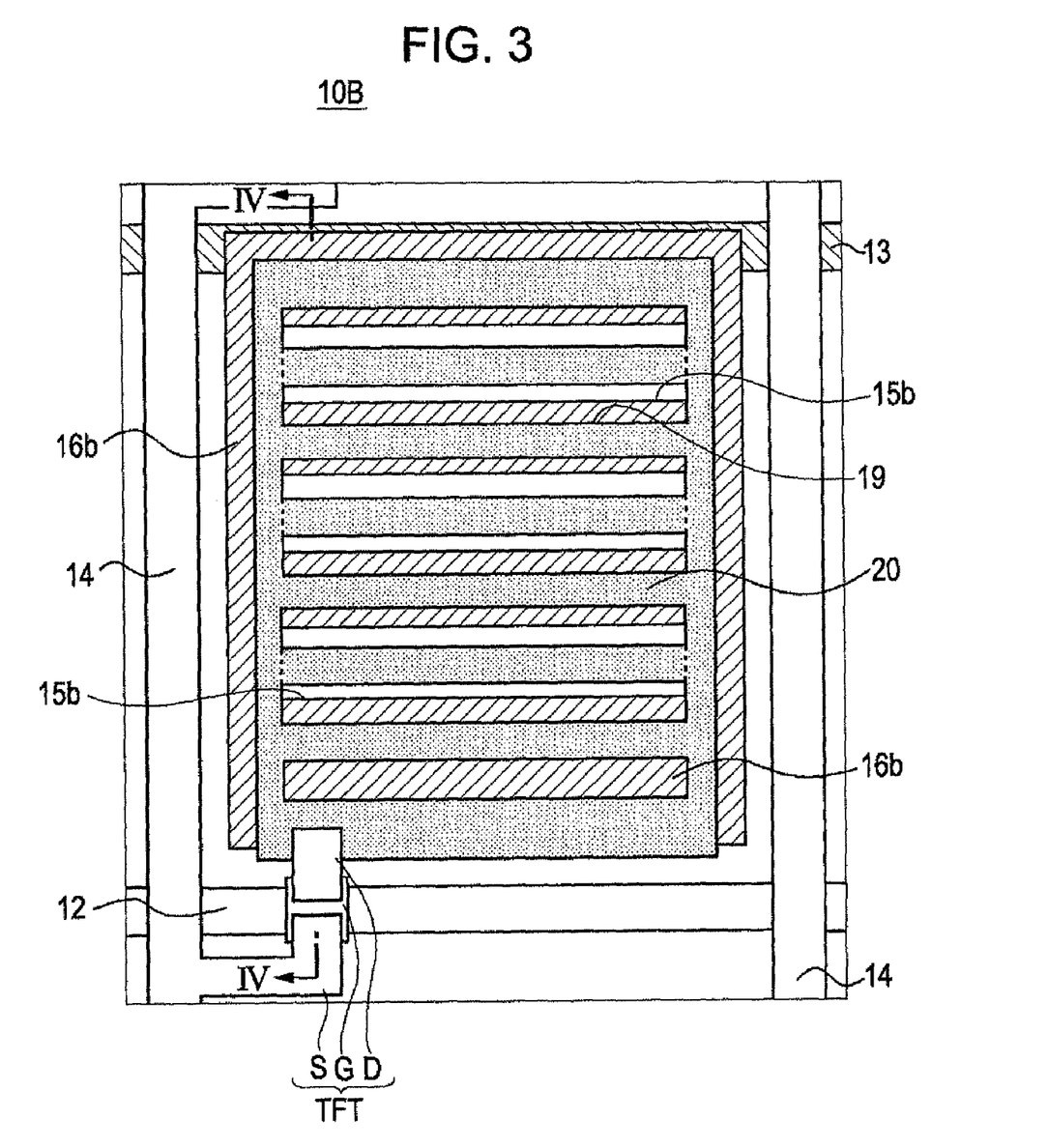
FIG. 3 is a schematic plan view illustrating a one-pixel area on a TFT substrate of a liquid crystal display panel according to a second embodiment of the invention.
Figure 4:
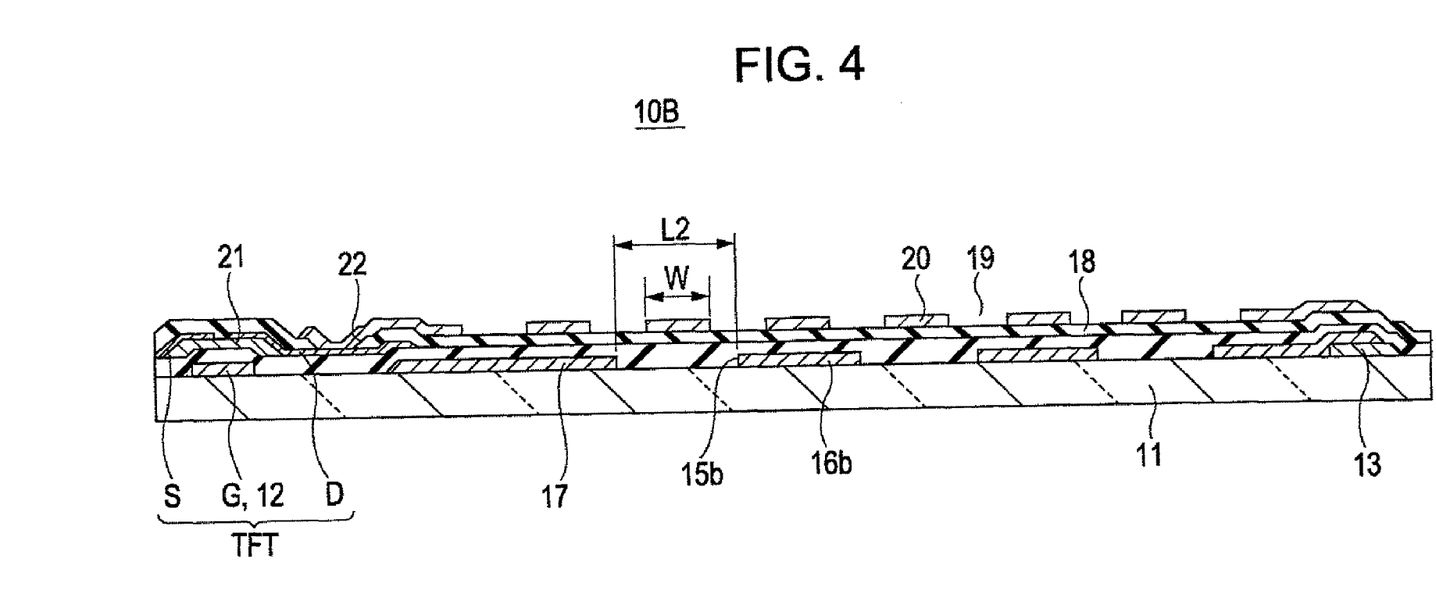
FIG. 4 is a sectional view taken along the line IV-IV of FIG. 3.
Figure 5:
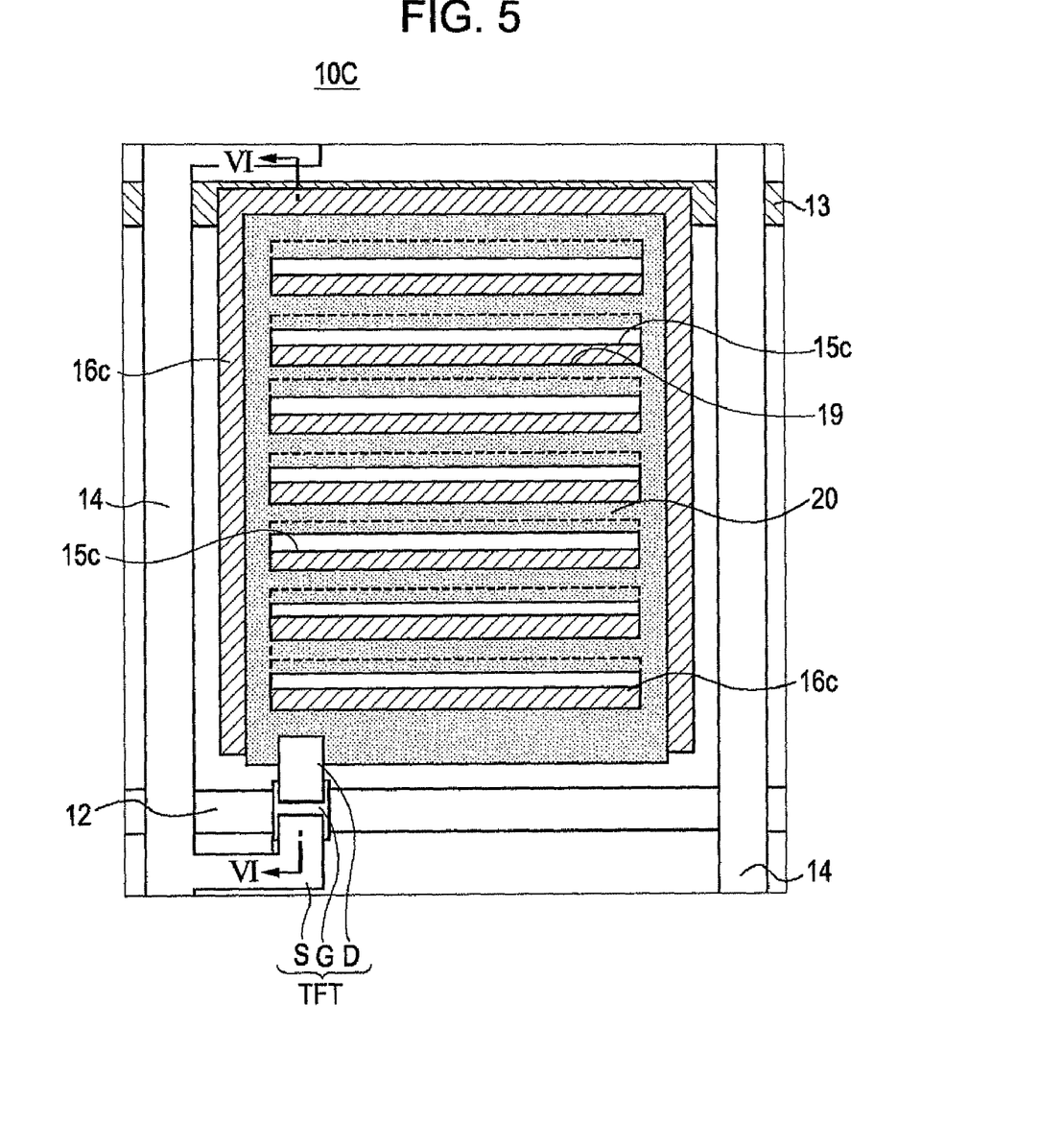
FIG. 5 is a schematic plan view illustrating a one-pixel area on a TFT substrate of a liquid crystal display panel according to a third embodiment of the invention.
Figure 6:
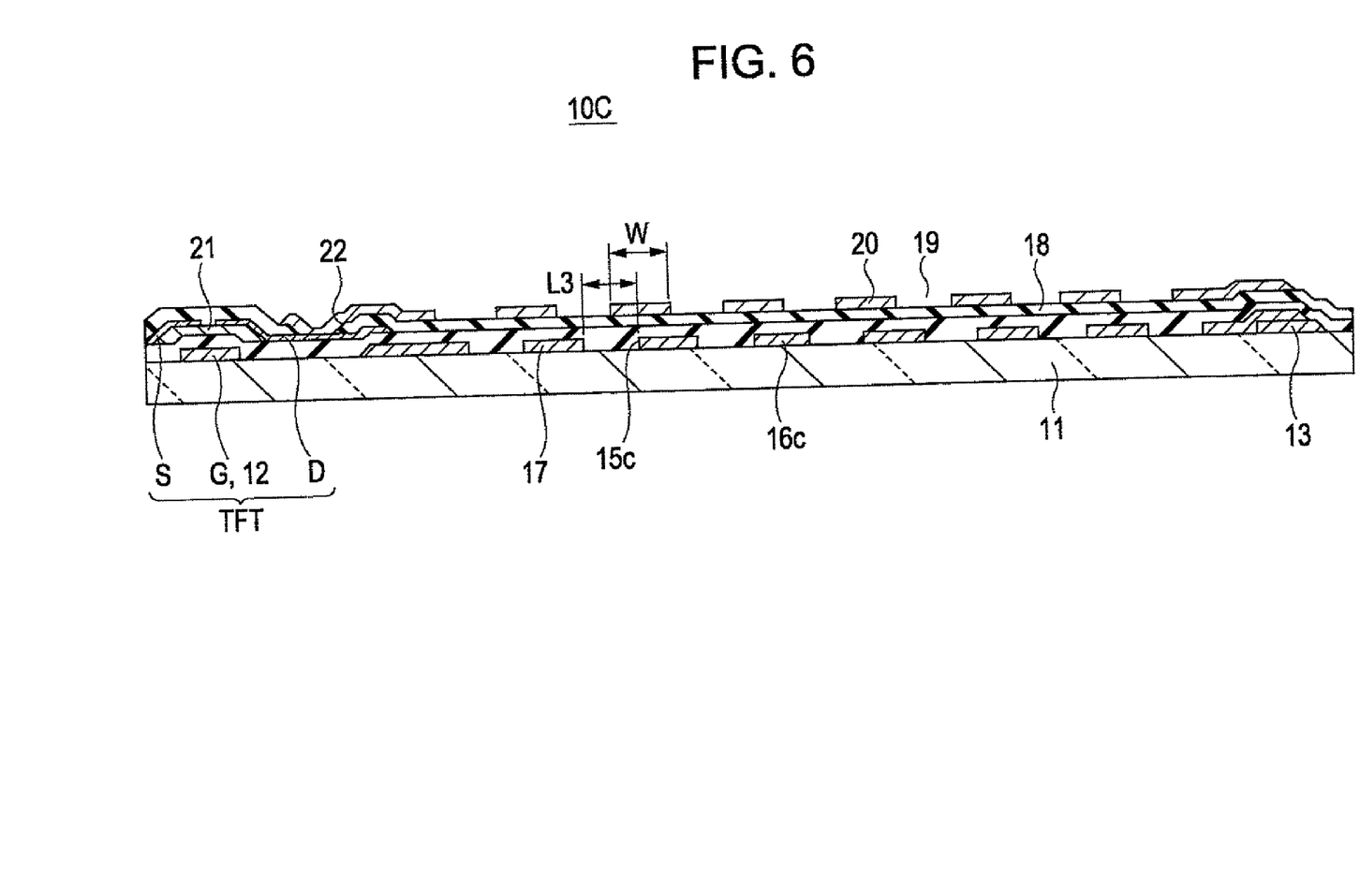
FIG. 6 is a sectional view taken along the line VI-VI of FIG. 5.

FIG. 1 is a schematic plan view illustrating a one-pixel area on a TFT substrate of a liquid crystal display panel according to a first embodiment of the invention. FIG. 2 is a sectional view taken along the II-II line of FIG. 1. FIG. 3 is a schematic plan view illustrating a one-pixel area on a TFT substrate of a liquid crystal display panel according to a second embodiment of the invention. FIG. 4 is a sectional view taken along the line TV-IV of FIG. 3. FIG. 5 is a schematic plan view illustrating a one-pixel area on a TFT substrate of a liquid crystal display panel according to a third embodiment of the invention. FIG. 6 is a sectional view taken along the line VI-VI of FIG. 5.

First Embodiment

A liquid crystal display panel 10A according to a first embodiment includes an array substrate AR and a color filtering substrate. In the array substrate AR, a plurality of scanning lines 12 are formed so as to be parallel with common wiring 13 on a first transparent substrate 11, and further, in a direction orthogonal to extension directions of the scanning lines 12 and the common wiring 13, a plurality of signal lines 14 are formed. Moreover, a lower electrode 16a, being composed of a transparent conductive material such as indium tin oxide (ITO) or indium zinc oxide (IZO), being connected to the common wiring 13, and having a plurality of stripe-shaped slits 15a formed therein, is formed so as to cover each of areas partitioned by the scanning lines 12 and the signal lines 14. Further, on a gate insulating film 17 covering the surface of the lower electrode 16a, a passivation film 18 is formed. In addition, the gate insulating film 17 and the passivation film 18 are composed of a silicon oxide film, a silicon nitride film, or the like. Moreover, each of upper electrodes 20, being composed of a transparent material such as an ITO and having a plurality of stripe-shaped slits 19 formed therein, is formed on the surface of the passivation film 18. Each bar-shaped portion between two successive slits out of the plurality of slits formed in the upper electrode 20 is formed so as to be of a width w which is substantially the same as the width of each of the plurality of stripe-shaped slits 19. Further, a surface covering each upper electrode 20 and the plurality of slits 19 formed therein is coated by an alignment film (not shown in figures). In addition, an arrangement relation between the slits 15a formed in each lower electrode 16a and the slits 19 formed in each upper electrode 20 will be described below in detail.

Moreover, a thin film transistor (TFT) functioning as a switching element is formed adjacent to a position at which one of the scanning lines 12 and one of the signal lines 14 intersect each other. With respect to this TFT, a semiconductor layer 21 is formed on the gate insulating film 17 covering the surface of the scanning lines 12, and a portion of the signal line 14, extending so as to partially cover the surface of the semiconductor layer 21, constitutes a source electrode S of the TFT, and a portion of the scanning lines 12, being located below the semiconductor layer 21, constitutes a gate electrode G of the TFT, and further, a portion of the upper electrode 21, overlapping a part of the semiconductor layer 21, constitutes a drain electrode D of the TFT.

Further, the color filtering substrate, which is omitted from being illustrated, includes a color filter layer, an overcoat layer and an alignment film on a second transparent substrate formed therein. Furthermore, it is possible to realize the liquid crystal display panel 10A employing the FFS mode by providing further configurations which allow, firstly, the array substrate AR and the color filtering substrate to be disposed so as to be opposite each other so that each pair of an upper electrode and a lower electrode included in the array substrate AR is opposite to a specific portion of the color filter layer included in the color filtering substrate, secondly, the liquid crystal layer to be shielded between the array substrate and the color filtering substrate, and thirdly, two polarization plates (not shown in figures) to be located outside the array AR substrate and the color filtering substrate, respectively, so that polarization directions thereof are orthogonal to each other.

In this liquid crystal display panel 10A according to the first embodiment, applying an electric field between an upper electrode 20 and the corresponding lower electrode 16a generates an electric field originating from each bar-shaped portion between two successive slits out of the slits 19 formed in the upper electrode 20 towards the lower electrode 16a through the slits 19 adjacent to both sides of the bar-shaped portion between two successive slits out of the slits 19 formed in the upper electrode 20, and thus, enables moving not only liquid crystal molecules existing above the slits 19 but also liquid crystal molecules existing above the upper electrode 20. Therefore, the liquid crystal display panel 10A employing the FFS mode according to the first embodiment has an advantage in that it is possible to realize a wide viewing angle and a high contrast ratio, and further, a high brightness owing to a high transparency ratio, to a greater degree than in the case of existing liquid crystal display panels employing the IPS mode.

Further, in existing liquid crystal display panels employing the FFS mode, an area of large dimensions in which, in plan view, each upper electrode and the corresponding lower electrode overlap each other collaterally forms a large storage capacitance. In the case of a liquid crystal display panel of small size, the storage capacitance generated in such a way as described above does not particularly require any other elements, such as a storage-capacitor electrode, in forming the storage capacitance, which are particularly required in liquid crystal display panels adopting the vertical mode or the IPS mode, and thus, leads to increasing of the aperture ratio. However, in the case of a liquid crystal display panel of middle or large size, each one-pixel area of large dimensions causes a storage capacitance formed therein to be relatively large, thus, making the size of each TFT be large enough to supply the corresponding pixel with a sufficient amount of charge, and as a result, this TFT of large size leads to reducing of the aperture ratio. Furthermore, increasing of the capacitance of each pixel leads to increasing the amount of power consumption in proportion thereto.

In order to overcome these disadvantages, in the liquid crystal display panel 10A according to the first embodiment, each lower electrode 16a has a plurality of stripe-shaped slits 15a formed therein. In addition, the stripe-shaped slits 15a formed in each lower electrode 16a are formed so as to be parallel with the slits 19 formed in the corresponding upper electrode 20. Forming the slits 15a of each lower electrode 16a so as to be parallel with the slits 19 of the corresponding upper electrode 20 in such a way as described above causes the direction of the electric field generated between the upper electrode 20 and the corresponding lower electrode 16a to orthogonally intersect with extension directions of long-length sides of the slits 19 formed in the upper electrode 20, and thus, enables reducing of misalignments of the liquid crystal molecules. Additionally, in the liquid crystal display panel 10A according to the first embodiment, each slit 15a formed in the lower electrode 16a is formed so as to be of a width L1 smaller than the width W of each bar-shaped portion between two successive slits out of the slits 19 formed in the upper electrode 20, and further, is formed so as to be, in plan view, entirely overlapped with the upper electrode 20 (refer to FIG. 2). That is, each slit 15a formed in the lower electrode 16a is located entirely below the upper electrode 20, and therefore, no part of the slits 15a is not seen, in plan view, from the slits 19 of the upper electrode 20. In addition, it is preferable that the width W of each bar-shaped portion between two successive slits out of the slits 19 formed in the upper electrode 20 (which is equal to the width of each slit 19 formed in the upper electrode 20) is approximately 3.5 μm to 4.0 μm, and further, taking into account manufacturing errors, the width of each slit 15a formed in the lower electrode 16a is approximately 1.5 μm to 2.0 μm.

Accordingly, in the liquid crystal display panel 10A according to the first embodiment, above each slit 15a formed in the lower electrode 16a, the upper electrode 20 certainly exists, and further, below each slit 19 formed in the upper electrode 20, the lower electrode 15a certainly exists. Therefore, in the liquid crystal display panel 10A according to the first embodiment, it is possible to reduce the storage capacitance, thus, downsize each TFT, and as a result, increase the aperture ratio, to a greater degree than in the case of existing liquid crystal display panels employing the FFS mode of the same size, and furthermore, it is possible to achieve displaying of images of a quality at least substantially the same as that of images displayed in the existing liquid crystal display panels employing the FFS mode. In addition, in the case where reduction of the storage capacitance is not required to this extent, it is possible to fulfill the requirement by reducing the number of slits 15a formed in each lower electrode 16a by, for example, forming only every second slit out of the slits 15a, or the like.

Second Embodiment

The liquid crystal display panel 10A according to the first embodiment has been described above by way of an example in which each slit 15a formed in the lower electrode 16a is formed so as to be of a width L1 smaller than the width W of each bar-shaped portion between two successive slits out of the slits 19 formed in the upper electrode 20, and further/is formed so as to be located, in plan view, being entirely overlapped with the upper electrode 20. However, in the case where further reduction of each storage capacitance is required, since, in the liquid crystal display panel 10A according to the first embodiment, a difference between the width of each bar-shaped portion between two successive slits out of the slits 19 formed in the upper electrode 20 and the width L1 of each slit of the lower electrode 16a becomes significantly small, it is difficult to accurately dispose each bar-shaped portion between two successive slits out of the slits 19 formed in the upper electrode 20 above the corresponding slit 15a formed in the lower electrode 16a. In order to overcome this difficulty, a liquid crystal display panel 10B according to the second embodiment, for which it is possible to further reduce the storage capacitance with ease even in such a difficult condition as described above, will be described below with reference to FIGS. 3 and 4. In addition, in FIGS. 3 and 4, the same elements as those included in the liquid crystal display panel 10A according to the first embodiment are denoted by the same reference signs as those of the corresponding elements shown in FIGS. 1 and 2, and further, detailed description of the same elements will be omitted below.

In this liquid crystal display panel 10B according to the second embodiment, each slit 15b of the lower electrode 16b is formed so as to be located below every second bar-shaped portion between two successive slits out of the slits 19 formed in the upper electrode 20, and be of a width L2 larger than the width W of the bar-shaped portion between two successive slits out of the slits 19 formed in the upper electrode 20 (refer to FIG. 4). By providing such a configuration, it is possible to form certain portions of the lower electrode 16b, which are seen, in plan view, from the slits 19 formed in the upper electrode 20, and also, certain portions of the upper electrode 20, below which any part of the lower electrode 16b does not exist. In the liquid crystal display panel 10B according to the second embodiment, allocating each bar-shaped portion between two successive slits out of the slits 19 formed in the lower electrode 16b below every second bar-shaped portion between two successive slits out of the slits 19 formed in the upper electrode 20, in such a way as described above, generates areas in the upper electrode 20, having no relation with forming of the storage capacitance, and thus, enables reducing of the storage capacitance to a significant degree. Further, making the width L2 of each slit 15b formed in the lower electrode 16b be larger than the width W of the bar-shaped portion between two successive slits out of the slits 19 formed in the upper electrode 20 requires no utilization of a high-resolution exposure device in forming the slits 15b of the lower electrode 16b, and further, enables suppressing of lowering of a transparency ratio due to increasing of the dimensions of the lower electrode 16b. In addition thereto, since a location relation between the alignment of bar-shaped portions formed in the upper electrode 20, each being located between two successive slits out of the slits 19 and having the width W, and the alignment of slits 15b formed in the lower electrode 16b, each having the width L2, is not so critical as that in the case of the liquid crystal display panel 10A according to the first embodiment, manufacturing of the liquid crystal display panel 10B is made easier. Accordingly, the liquid crystal display panel 10B according to the second embodiment enables utilization of a low-cost exposure device during a manufacturing process thereof, and further, realization of a liquid crystal display panel employing the FFS mode, capable of displaying images with further improved brightness with ease.

Third Embodiment

A liquid crystal display panel 10C according to the third embodiment, which is capable of reducing the storage capacitance to a greater degree than the liquid crystal display panel 10A according to the first embodiment, will be described below with reference to FIGS. 5 and 6. In addition, in FIGS. 5 and 6, the same elements as those included in the liquid crystal display panel 10A according to the first embodiment are denoted by the same reference signs as those of the corresponding elements shown in FIGS. 1 and 2, and further, detailed description of the same elements will be omitted.

In this liquid crystal display panel 10C according to the third embodiment, each slit 15c of the lower electrode 16c to be formed below the upper electrode 20 is formed so as to be certainly seen, in plan view, from one of the slits 19 formed in the upper electrode 20. That is, in the liquid crystal display panel 10C according to the third embodiment, certain portions of the upper electrode 20 are formed certainly at locations opposite to the slits 15c formed in the lower electrode 11c, and thus, the portions of the upper electrode 20 have no relation with forming of the storage capacitance, and as a result, it is possible to reduce each storage capacitance.

In this liquid crystal display panel 10C according to the third embodiment, it does not matter whether the width L3 of each slit 15c in the lower electrode 16c is the same as, smaller than, or larger than the width w of each bar-shaped portion between two successive slits out of the slits 19 formed in the upper electrode 20. An important point is that each slit 19 in the upper electrode 20 is to be formed at substantially the same pitch as a pith at which each slit 15c in the lower electrode 16c is formed. That is, even in the case where the width L3 of each slit 15c formed in the lower electrode 16c is substantially the same as the width W of each bar-shaped portion between two successive slits out of the slits 19 formed in the upper electrode 20, provided that each slit 19 of the upper electrode 20 is formed at the same pith as a pith at which each slit 15c of the lower electrode 16c is formed, in proportion to increasing of a ratio of non-overlapping areas to overlapping areas, in plan view, between each upper electrode 20 and the corresponding lower electrode 16c, it is possible to reduce each storage capacitance. In this liquid crystal display panel 10C according to the third embodiment, since a location relation between the alignment of the bar-shaped portions, each being located between two successive slits out of the slits 19 formed in the upper electrode 20 and having the width W, and the alignment of the slits 15c formed in the lower electrode 16c, each having the width L3, is not so critical as a location relation in the case of the liquid crystal display panel 10A according to the first embodiment, manufacturing of the liquid crystal display panel 10C is made easier. However, it is to be noted that increasing of the ratio of non-overlapping areas to overlapping areas, in plan view, between each upper electrode 20 and the corresponding lower electrode 16c leads to increasing of areas in the upper electrodes 20, below which no part of the lower electrodes 16c exists, thus, increasing of areas which are likely not to allow the liquid crystal display panel 10C to sufficiently operate as a liquid crystal display panel employing the FFS mode, and results in reducing quality of images to be displayed. Therefore, in the liquid crystal display panel 10C according to the third embodiment, the ratio of non-overlapping areas to overlapping areas, in plan view, between each upper electrode 20 and the corresponding lower electrode 16c is to be determined to be at most 50%.

In the liquid crystal display panel 10C according to the third embodiment, it is preferable that a pitch (i.e., a forming interval) at which each slit 19 is formed in the upper electrode 20, which is equal to a pitch at which each slit 15c is formed in the lower electrode 16c, is approximately 7 μm to 8 μm, which is equivalent to double the width W of each bar-shaped portion between two successive slits out of the slits 19 formed in the upper electrode 20. Further, in the liquid crystal display panel 10C according to the first embodiment, each storage capacitance can be reduced and each TFT can be downsized to a greater degree than in the case of existing liquid crystal display panels employing the FFS mode of the same size, and thus, it is possible to achieve a liquid crystal display panel having advantages the same as or similar to those of the liquid crystal display panel 10A according to the first embodiment.

Additionally, in each of the above-described liquid crystal display panels 10A, 10B and 10C according to the first, second and third embodiments, respectively, each lower electrode is formed on the surface of the first transparent substrate 11. However, according to a preferable aspect of the invention, each lower electrode may be formed on the surface of an inter-layer film which is formed on the surface of the transparent substrate 11. Such a configuration which allows the lower electrode to be formed on the surface of the inter-layer film causes all of elements, such as a lower electrode, an insulating film and an upper electrode, constituting the liquid crystal display panel employing the FFS mode to be formed on the inter-layer film, thus, enables forming of an upper electrode and the corresponding lower electrode across a region of large dimensions within each pixel area, and as a result, it is possible to achieve a liquid crystal display panel employing the FFS mode having a higher aperture ratio, and thus, being capable of displaying images with a higher brightness.

The entire disclosure of Japanese Patent Application No. 2008-173104, filed Jul. 2, 2009 is expressly incorporated by reference herein.

What is claimed is:

1. A liquid crystal display panel, comprising:
A pair of substrates which are disposed so as to be opposite each other and have a liquid crystal layer interposed therebetween;
an upper electrode configured to be included in one substrate of the pair of substrates, and be formed so as to have a plurality of slits therein; and
a lower electrode configured to be included in the one substrate of the pair of substrates, and be formed on an insulating film covering the upper electrode so as to be partially overlapped with the upper electrode in plan view,
wherein the lower electrode has at least one slit which is formed so as to be parallel with the plurality of slits formed in the upper electrode, and
wherein the at least one slit formed in the lower electrode is located entirely below the upper electrode in plan view.

2. The liquid crystal display panel according to claim 1, wherein the at least one slit formed in the lower electrode is formed so as to be of a width smaller than a width of each portion between two successive slits out of the plurality of slits formed in the upper electrode, and be entirely overlapped with the upper electrode in plan view.

3. The liquid crystal display panel according to the claim 1, wherein the number of the at least one slit formed in the lower electrode is less than the number of the plurality of slits formed in the upper electrode.

4. The liquid crystal display panel according to claim 1, wherein each of the at least one slit formed in the lower electrode is formed so as to be of a width larger than a width of each portion between two successive slits out of the plurality of slits formed in the upper electrode.

5. The liquid crystal display panel according to claim 1, wherein the at least one slit formed in the lower electrode includes a plurality of slits, and
wherein each of the plurality of slits formed in the lower electrode is disposed below every second portion of the portions located between two successive slits out of the plurality of slits formed in the upper electrode.

6. The liquid crystal display panel according to claim 1, wherein the lower electrode is formed on a inter-layer film which is formed in the one substrate of the pair of substrates.

* * * * *